United States Patent [19]

Kirwan

[11] 4,179,997
[45] Dec. 25, 1979

[54] RAIL-HIGHWAY INTERMODAL FREIGHT CARRIER TRANSPORT SYSTEM

[75] Inventor: George B. Kirwan, Huntington, W. Va.

[73] Assignee: Intermodal Concepts, Inc., Chambersburg, Pa.

[21] Appl. No.: 863,916

[22] Filed: Dec. 23, 1977

[51] Int. Cl.² .................. B61D 3/16; B61F 3/12; B65J 1/02; B65J 1/22
[52] U.S. Cl. .................. 410/53; 410/57; 410/4 R; 410/159; 414/333
[58] Field of Search .................. 105/4 R, 159, 366 B, 105/366 D, 366 R, 368 B, 368 R, 368 S, 368 T, 463

[56] References Cited

U.S. PATENT DOCUMENTS

| | | | |
|---|---|---|---|
| 2,036,535 | 4/1936 | Nelson | 105/159 |
| 2,709,969 | 6/1955 | Andert | 105/159 |
| 2,787,971 | 4/1957 | Obes | 105/368 B X |
| 2,844,108 | 7/1958 | Madden | 105/368 B X |
| 2,992,621 | 7/1961 | Schoen | 105/368 B X |
| 3,002,470 | 10/1961 | Flomers | 105/4 R X |
| 3,204,579 | 9/1965 | Burns et al. | 105/366 C |
| 3,556,456 | 1/1971 | Lunde | 105/463 X |
| 3,568,607 | 3/1971 | Gutridge | 105/366 R |
| 3,576,167 | 4/1971 | Macomber | 105/159 |
| 3,610,168 | 10/1971 | Macomber | 105/159 |

Primary Examiner—Trygve M. Blix
Assistant Examiner—Howard Beltran
Attorney, Agent, or Firm—F. Travers Burgess

[57] ABSTRACT

A system for moving freight carriers including highway semi-trailers and receptacles such as demountable containers and merchandise racks in trains on railway tracks includes railway trucks, each slidably mounting a transversely centered fifth wheel support to permit its positioning at different locations longitudinally of the truck and swivelly mounting a pair of longitudinally disposed structures each including a pair of transversely spaced treadways for supporting semi-trailer highway wheels such that the highway wheels at the rear of one semi-trailer can be supported on one wheel supporting structure and the fifth wheel support can be positioned between the treadways of the other wheel supporting structure to support the front end of another semi-trailer, whereby a plurality of semi-trailer and railway trucks are linkable into a train with the front end of the leading semi-trailer supported on the fifth wheel support of a road-rail tractor. Compatible devices are provided on the treadways for positioning semi-trailer highway wheels thereon and for supporting and securing demountable containers and merchandise racks on the trucks.

26 Claims, 13 Drawing Figures

RAIL-HIGHWAY INTERMODAL FREIGHT CARRIER TRANSPORT SYSTEM

BACKGROUND OF THE INVENTION

1. Field of the Invention

The invention relates to railway rolling stock and consists particularly in a system for transporting freight carriers including highway semi-trailers and receptacles such as demountable containers and merchandise racks by rail.

2. The Prior Art

Systems of moving highway semi-trailers by rail have generally utilized substantially conventional flat cars of sufficient length to support the full length of one or two highway semi-trailers with the highway wheels of the semi-trailers resting on the car deck and the king pin secured to an upstanding pedestal-mounted fifth wheel on the car deck. Such systems have numerous disadvantages in that the great over-all height of the flat car and the semi-trailers with their complete running gear creates clearance problems, particularly in tunnels, and provides a vehicle with a very high center of gravity and correspondingly subject to high overturning moments. Further, much excess weight is present in the form of the full-size railway flat car with its necessarily heavy underframe, trucks, draft gear and brake equipment.

The conventional equipment requires circus-type loading in which a train of flat cars are connected by bridges with a ramp at the forward end and the semi-trailers are successively backed onto the flat cars by tractors which must traverse the full length of the train to load the rearmost trailer. Atempts have been made to lower the over-all height by providing highway wheel pockets in the flat car decks or providing depressed center flat cars arranged to receive the highway wheels in the center depressed portion. In connection with the latter arrangement turntables and transfer tables have been provided in the center depressed portions of such cars to receive the highway wheels and to permit side loading, thus avoiding the disadvantages of circus-type loading. Although the last-mentioned arrangements have partially solved the over-all height and loading problems, they still require the use of a relatively heavy double truck flat car or depressed center car with turntable or transfer tables.

Further attempts to solve the problem have provided for the elimination of the conventional supporting flat car by providing smaller four-wheel trucks, each equipped with a fifth wheel support for engaging the king pin and supporting the front end of one highway trailer and means for supporting and blocking the highway wheels on an adjacent semi-trailer, utilizing the railway truck frame as the connecting link between adjacent trailers and forming trains from such railway trucks and trailers, as disclosed in L. G. Schoen U.S. Pat. No. 2,992,621 and F. S. Macomber U.S. Pat. Nos. 3,576,167 and 3,610,168. In these three patents the positions of the fifth wheel pedestals and the highway wheel supporting means are fixed longitudinally of the rail truck, i.e., the fifth wheel pedestal is adjacent one end of the railway truck and the highway wheel-supporting structure is adjacent the other end of the rail truck. These arrangements require that the rail trucks be turned at each end of a run in order that the fifth wheel pedestal supports be at the rear of the rail truck and the highway wheel supporting means be at the forward end of the rail truck so that trains made up of trailers and the rail trucks can be operated with the forward ends of the trailers at the front. Additionally, since the spacing between the fifth wheel supports and the highway wheel supports on the rail trucks of these patents are fixed, in the event that a trailer with a longer than normal forward overhang and/or one with a longer than normal rear overhang were to be transported in end to end relation, they could not be mounted on a common rail truck.

SUMMARY OF THE INVENTION

The invention provides a system for transporting highway semi-trailers in trains by rail, utilizing improved rail trucks as the sole support of adjacent rear and front ends of highway semi-trailers and as the sole connecting means between such semi-trailers, to form trains.

The improved trailer supporting rail trucks are constructed so as to be fully reversible by permitting the support of the forward and rear ends of connected semi-trailers at either end of the truck. The rail trucks are made reversible by providing permanently mounted highway wheel supporting structures capable of swiveling on the truck frame adjacent both ends of the truck such that either of the wheel supporting structures may be selectively utilized to support the highway wheels at the rear end of a semi-trailer and by mounting a fifth wheel pedestal structure on the railway truck in such a manner in relation to the wheel supporting structures that it can be positioned abreast of either of the wheel supporting structures at either end of the track and thereby utilized to support the forward end and kingpin of a second trailer when the rear end of the first trailer is supported through its highway wheels on the wheel supporting structure at the other end of the railway truck.

The selective positionability of the fifth wheel pedestal at either end of the railway truck abreast of the corresponding highway wheel support structure is achieved by mounting the fifth wheel support structure in a guideway extending longitudinally of the truck frame and centrally disposed transversely thereof, the wheel supporting structures each consisting of a pair of trough-like treadways with a transverse connection between them extending beneath the fifth wheel pedestal guide structure so that the fifth wheel pedestal base can be slid lengthwise of the rail truck without interference from the transverse elements of the wheel supporting structures, the base of the pedestal being sufficiently narrower than the transverse spacing between the treadways as to permit its longitudinal movement from end to end of the truck without interference with the treadways. The fifth wheel itself is reversibly rotatably mounted on its pedestal for reversing in accordance with the location of the pedestal on the truck frame.

In order to provide flexibility in the relative forward and rear overhangs of semi-trailers carried by the trucks, the pedestal is arranged to be selectively positioned at different locations at each end of the truck.

In order to accommodate trains made up of trailers and railway trucks incorporating the invention to operation on curved tracks, the wheel supporting structures are connected to the truck frame for limited swiveling of the trailer front ends with respect to the respective rail trucks being accommodated through the pivotal connection of the fifth wheel and the semi-trailer kingpin.

DETAILED DESCRIPTION OF THE INVENTION

The system for handling highway semi-trailers and moving them in trains by rail includes at each terminal a paved section of track 1, in which the payment is preferably flush or nearly flush with the heads of rails 3 except for the usual flangeway extending along the inner edge of each rail head. Only the loading areas need be paved, the remainder of the track being of conventional open construction wherein rails 3 are secured to transverse cross ties 5 set in suitable ballast 7.

For supporting highway semi-trailers and providing a draft link between adjacent semi-trailers, a four-wheel railway platform truck generally indicated at 7 is supported by wheels 9 on track rails 3. The numeral 11 denotes the body of a highway semi-trailer of conventional construction supported at its rear end by a bogie having longitudinally spaced pairs of pneumatic-tired highway wheels 13 and at its forward end a depending king pin 15. Rearwardly of king pin 15 the usual vertically adjustable landing gear legs 16 depend from the semi-trailer body 17 to provide support for the forward end of semi-trailer body 11 when king pin 15 is not otherwise supported. A road-rail tractor generally indicated at 17 has pairs of longitudinally spaced pneumatic-tired highway wheels 19, an underframe 21 supported thereon, a cab 23 supported on the forward end of the underframe, and an elevatable fifth wheel 25 supported on the rear portion of underframe 21. On the forward and rear end portions of underframe 21 vertically movable flanged railway wheels 27 are supported, movement downwardly into rail-engaging position and upwardly out of rail-engaging position being effected by fluid cylinders 29 controllable from tractor cab 23.

For loading the highway wheels 13 of a semi-trailer on railway truck 7, a suitable ramp 31 having its lower end restable on the pavement 1 and its upper end on the top of railway truck 7 is provided.

Ramp 31 preferably consists of a pair of upwardly open channels 32 spaced apart transversely a sufficient distance to receive the highway wheels of a semi-trailer. It is preferably supported on a motorized low-lift truck 34 whereby it can be readily transported from one location in the loading area to another and the inclination of the ramp and the height of its upper end varied to assure its engagement with the upper surface of the railway trucks 7.

The construction of railway truck 7 can best be understood by reference to FIGS. 5–9 in which it will be noted that the truck has a pair of longitudinally spaced axles 33, each mounting a pair of small diameter railway wheels 9 in gauged relation with each other. Roller bearing journal boxes 39 in suitable adaptors 41 are vertically slidably received between pedestal legs 43 depending in longitudinally spaced pairs from truck frame 45 which each axle box adaptor 41 supports by means of spring units 47.

Truck frame 45 comprises longitudinally spaced side sills 49, each of outwardly open channel cross section, longitudinally spaced transversely extending end sills 51 of similar cross section, and a plurality of transversely extending longitudinally spaced cross tie members 53, 55, 57, 59, cross tie members 53 and 55 being disposed fore and aft of the respective axles 33 and forming the connection of pedestals 43 to the truck frame.

For securing semi-trailer supporting equipment to truck frame 45, the truck frame is provided with guide structure having a pair of transversely spaced centrally disposed webs 61 secured to the tops of cross ties 53, 55, 57 and 59 with suitable notches in their lower edges to fit over the respective cross ties, and their ends secured to the inner surfaces of end sills 51. Substantially flush with the tops of cross ties 53, 55, 57 and 59, a horizontal web 63 extends transversely between bars 61, 61 the full length of truck frame 45 and in the regions between cross ties 57 and the adjacent end sills 51 are underlyingly supported by spaced gussets 65. In the regions between cross ties 55 and the adjacent end sills 51, each web 61 mounts an inwardly extending horizontal web 67, both webs 67 being in vertically spaced relation with horizontal web 63 and spaced apart from each other transversely to define a central slot and a pair of inwardly extending grooves 69 on the inner surfaces of each of the webs 61. Each of the webs 67 is similarly reinforced by gussets 65 similar to those underlyingly supporting bottom web 63. Between cross ties 57 webs 61 are the vertical webs of angle bars 71 and webs 67 are the inwardly facing flanges 73 of angle bars 71 such that grooves 61 are continuous throughout the length of truck frame 45.

For supporting the highway semi-trailer king pins 15 on railway trucks 7 at selected positions lengthwise of the respective truck frames 45 and at either end thereof, whereby to permit reverse operation of the trucks so as to avoid turning them at terminals, a fifth wheel pedestal structure is provided comprising a base plate 75 having an elongated element of T-shaped cross section comprising a horizontal guide web 77 vertically spaced below plate 75 and slidably received in guide structure grooves 69 and upstanding transversely spaced vertical webs 79 which pass through the longitudinal slot defined by inwardly extending bars 67, such that the entire structure 75–79 can be shifted lengthwise of the truck frame.

For positioning pedestal structure 75–79 in selected positions lengthwise of the truck frame, guide structure web 63 is formed between cross ties 55 and 57 with a centrally disposed hole 81, pedestal base plate 75 is formed with a pair of longitudinally spaced holes 83, and a pin 85 is positioned in holes 83, 81 when they are aligned, either of the holes 83 in base plate 75 being alignable with the desired hole 81 in the web 63 for positioning base plate 75 accordingly lengthwise of the truck frame. Base plate 75 mounts a pedestal comprising four upright slightly inclined legs 87 and a top member 89 on which is rotatably and pivotally mounted a fifth wheel member 91.

Figure 5:
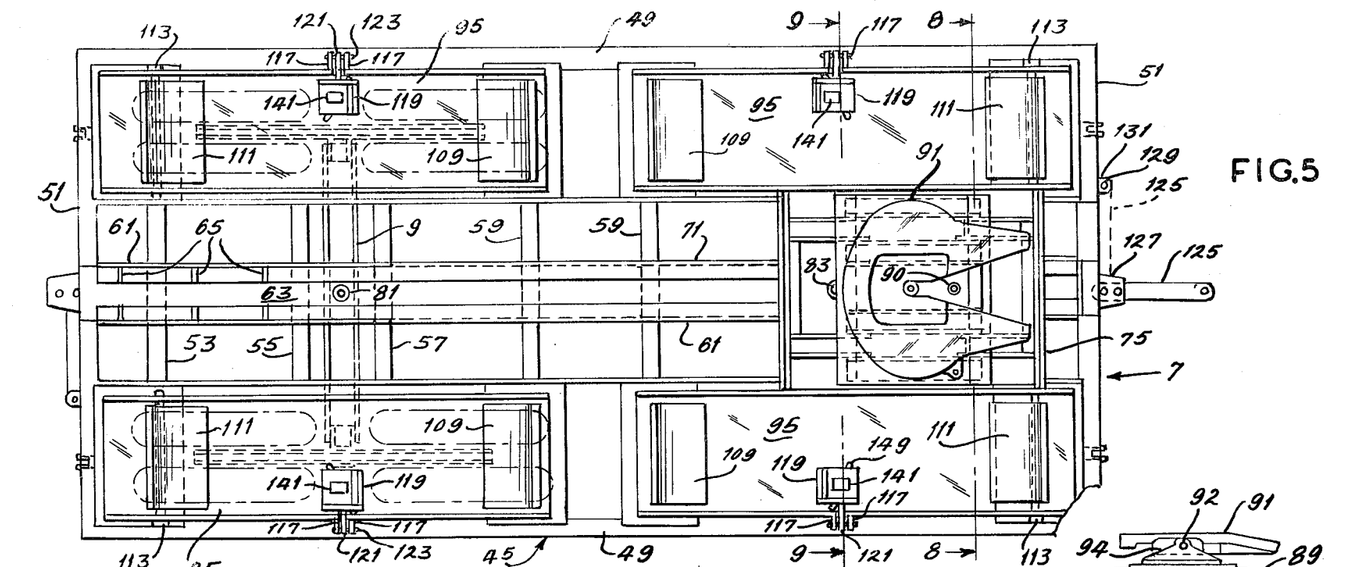
FIG. 5 is an enlarged plan view of a railway truck including the wheel supporting structures and movable fifth wheel pedestal.
Figure 6:
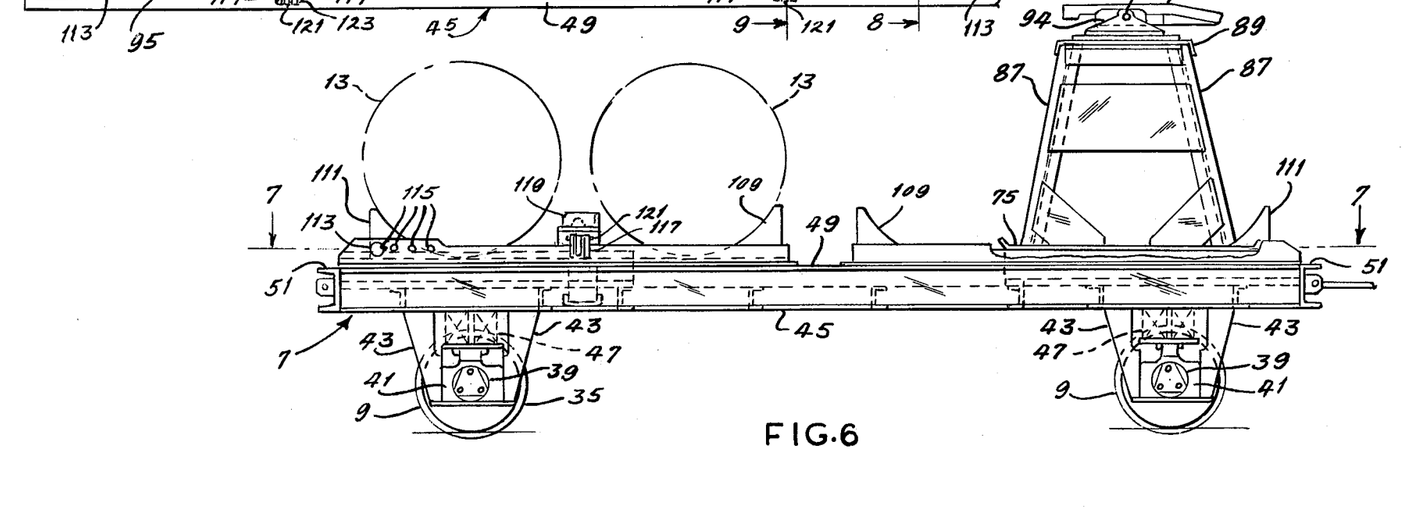
FIG. 6 is an enlarged side elevational view of the railway truck illustrated in FIGS. 1–5.
Figure 7:
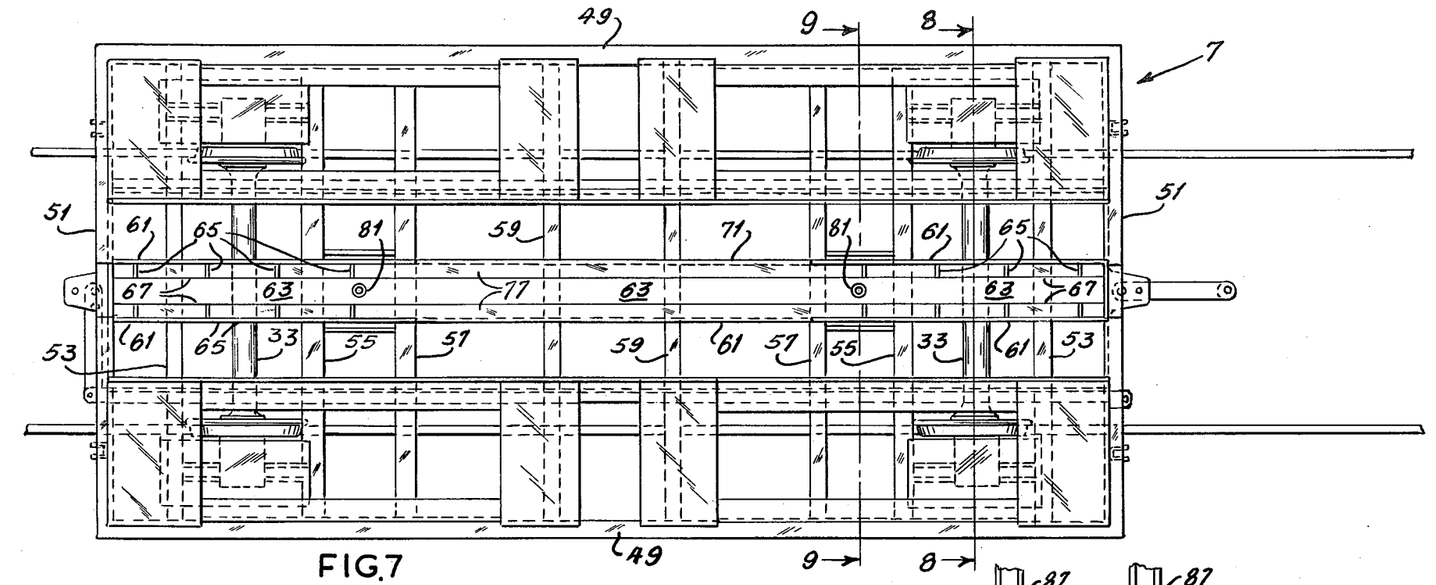
FIG. 7 is a top view of the truck frame without the wheel supporting structures and fifth wheel pedestal.
Figure 8:
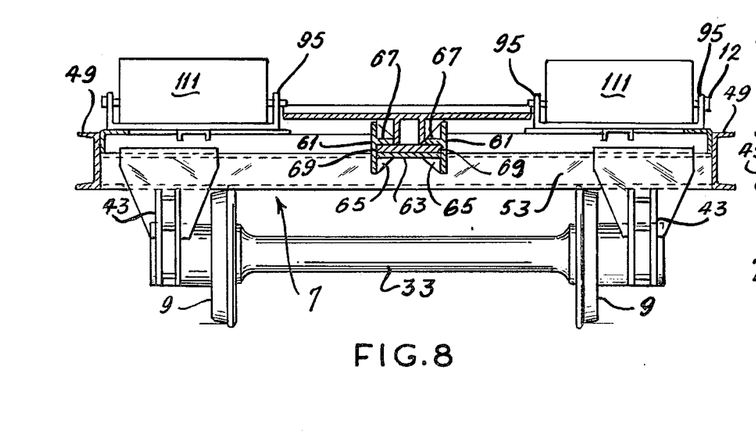
FIG. 8 is a transverse vertical sectional view taken along line 8—8 of FIGS. 5 and 7.
Figure 9:
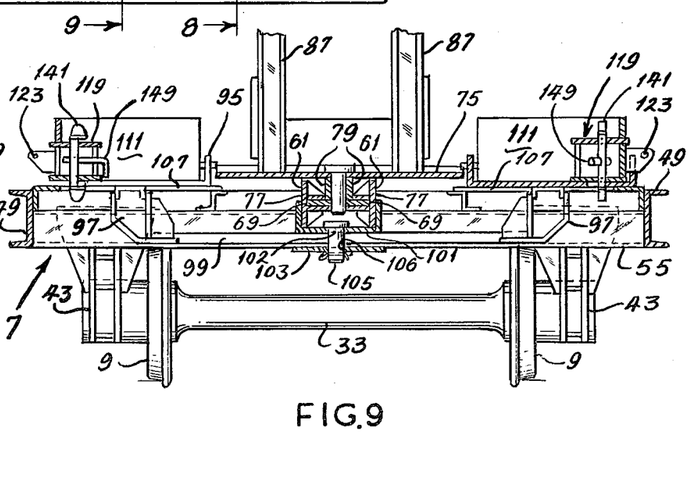
FIG. 9 is a transverse vertical sectional view taken along lines 9—9 of FIGS. 5 and 7.

Fifth wheel 91 is tiltably mounted by transverse trunnion pin 92 on a trunnion element 94 swivelly mounted on pedestal top plate 89, so that the fifth wheel jaws may be faced in either direction longitudinally of the truck, i.e., rearwardly with regard to direction of movement of the train, being held in the selected position by pin 90 passing through aligned holes in the bottom plate of the trunnion member and the top member 89 of the pedestal. The fifth wheel is provided with the usual locking means for selectively securing a semi-trailer king pin 15 in draft transmitting relation with the fifth wheel.

For supporting the highway wheels 13 of semi-trailers 11 on truck frame 45, highway wheel supporting structures, each comprising a transversely spaced pair of upwardly open channel treadways 95, is positioned on each end portion of the truck frame, each of the treadways 95 is formed with a depending bracket 97, and the brackets 97 are connected by a transversely extending shallow channel member 99 underlying the central guide structure webs 61 and positioned midway between cross ties 55 and 57. For swivelly connecting transverse channel member 99 to the truck frame, a horizontal plate 101 is secured to the bottom edges of bars 61 between cross ties 55 and 57 so that plate 101 overlies channel member 99 and a second plate 103 is similarly secured to the bottoms of cross ties 55 and 57 and underlies channel 99, plates 101 and 103 and the horizontal web of channel 99 being formed with aligned central holes 102, 104 and 106, respectively, receiving a vertical pivot pin 105. The bottoms of the end portion of treadways 95 rest on deck plates 107 suitably secured on the truck frame in longitudinally spaced relation with each other so that the wheel-supporting structure 95-99 is capable of limited swivelling movement to accommodate operation of a train of supported highway trailers on curved as well as tangent track.

Base plate 75 is just slightly narrower than the distance between the inner flanges of treadways 95 so that when the base plate is abreast of either of the wheel supporting structure it locks that wheel supporting structure against swivelling movement without interfering with necessary swivelling movement of the other wheel supporting structure, and by aligning both wheel supporting structures with each other the fifth wheel support structure 75-89 is movable the full length of truck frame 45 to desired positions abreast either of the wheel supporting structures 95-99. Each of the wheel supporting treadways 95 is provided at its inner end with a fixed chock 109 and at its outer end with a removable chock 111, the latter chocks being held in position by elongated pins 113 which are selectively engageable with any aligned pair of longitudinally spaced apart holes 115 in the flanges of the treadway channel members in accordance with the wheel spacing of any particular semi-trailer.

Figure 10:
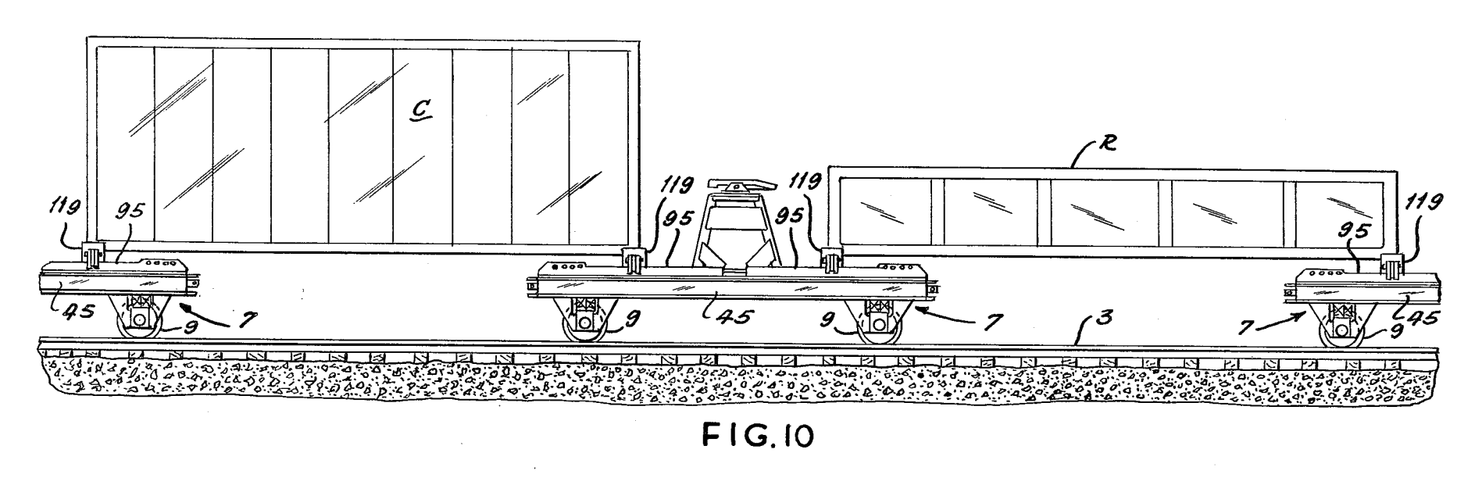
FIG. 10 is a side elevational view showing a container and merchandise rack supported on railway trucks in accordance with the invention.
Figure 11:
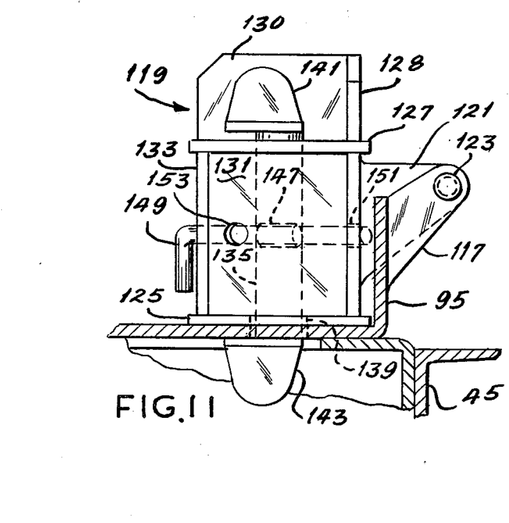
FIGS. 11–13 are respectively transverse, outside and top views of a pedestal support element for containers and racks.
Figure 12:
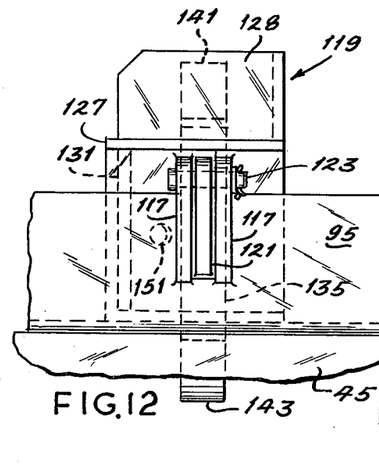

For supporting and securing standard demountable containers C and merchandise racks R on railway trucks for transportation thereon, as seen in FIGS. 10 and 11, without interfering with the use of the truck at other times to carry semi-trailers, each of the treadways 95 is formed with an outboard clevis-like bracket 117 on its outer flange intermediate the ends thereof and a pedestal support element 119 is pivotally connected to the respective clevis 117 of each treadway by means of an outboard arm 121 and a pivot pin 123, such that pedestal support elements 119 can be swung outwardly clear of the wheel-receiving surface of the respective treadway during loading and unloading of semi-trailers on the trucks.

Figure 13:
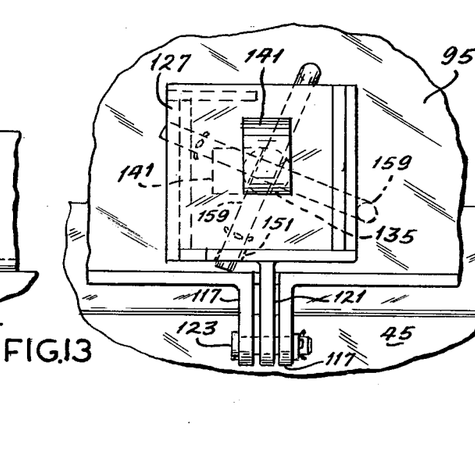

As best seen in FIGS. 13-15, each pedestal support element 119 consists basically of a rectangular box-like member having a horizontal bottom wall 125 restable on the web of the respective treadway, a top wall 127, an outer longitudinal wall 129 mounting pivot bracket 121, an end wall 131, a partial inside wall 133, and an upstanding parapet on the top wall 127 comprising an outside wall section 128 and a transverse wall section 130 engageable with a corner of a container or rack. A securing lug having a vertically disposed cylindrical shank 135 passes through circular holes 137 and 139 in top and bottom walls 127 and 125 and terminates in flat eccentric ends 141 and 143, ends 141 and 143 normally being elongated transversely of the treadway to permit end 143 to enter a transversely elongated slot 145 in the treadway web. Lug shank 135 is provided with a central diametral bore 147 receiving an L-shaped cylindrical key 149 which may be rotated from a lug-release position substantially transverse of the respective treadway, in which the straight end of key 149 passes through a hole 151 in outer wall 129 and a locking position substantially at right angles thereto in which the straight end of the key passes through a hole 153 in end wall 131, such movement of key 149 rotating lug ends 141 and 143 from a position transverse of the treadway to a position longitudinally of the treadway wherein lower end 143 lockingly engages the bottom edge of the treadway and upper end 141 lockingly engages the locking flange on the bottom of the demountable container or merchandise rack.

Figure 1:
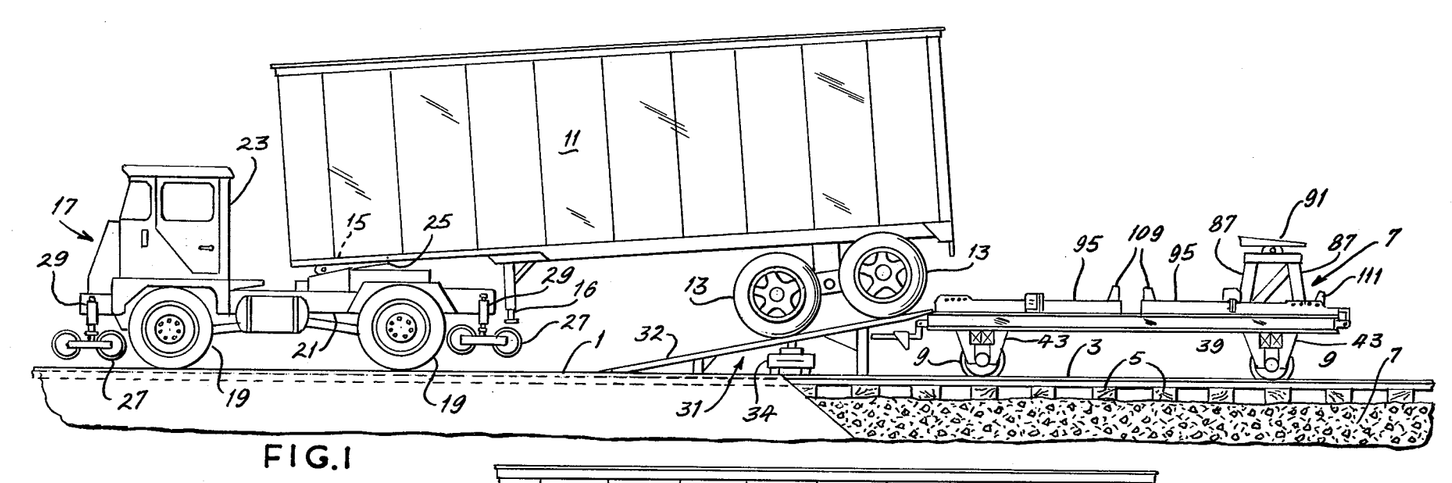
FIG. 1 is a side elevational view of a railway truck constructed according to the invention positioned in the loading area with a semi-trailer being pushed toward it by a road-rail tractor.
Figure 2:
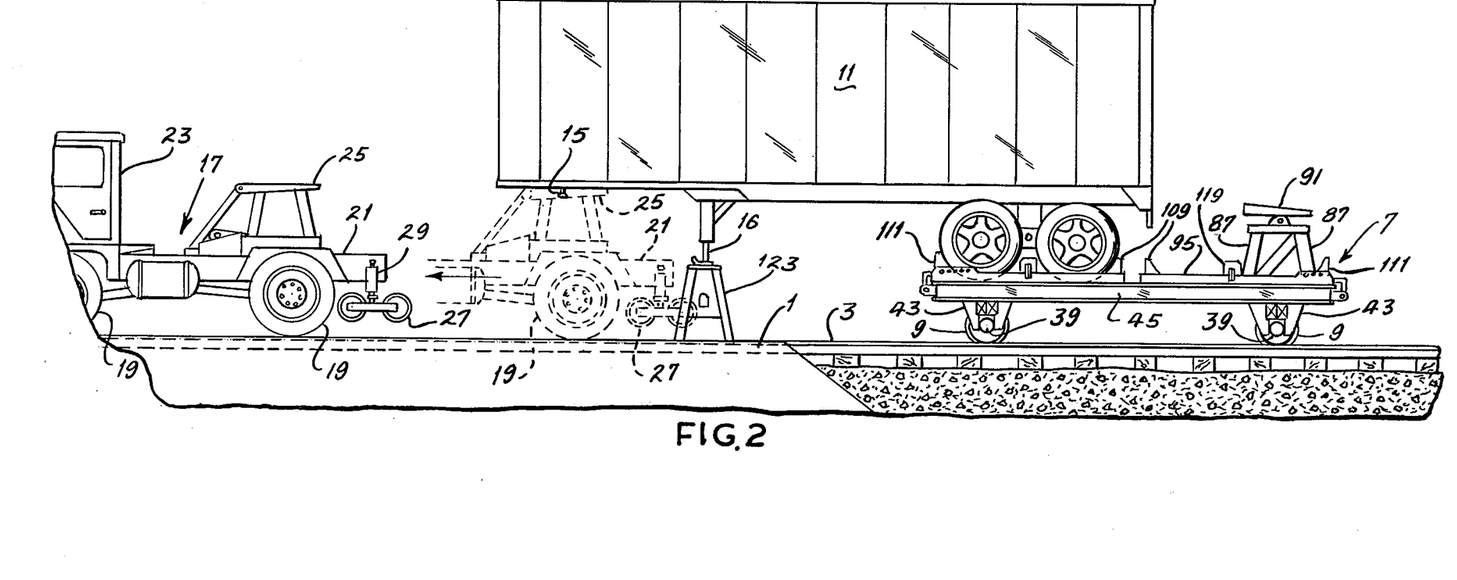
FIG. 2 is a side elevational view corresponding to FIG. 1 but showing the highway wheels of the semi-trailer mounted on the railway truck with the semi-trailer positioned with its landing gear resting on a portable stanchion to position its forward end in readiness for engagement with the fifth wheel pedestal element on a second railway truck.
Figure 3:
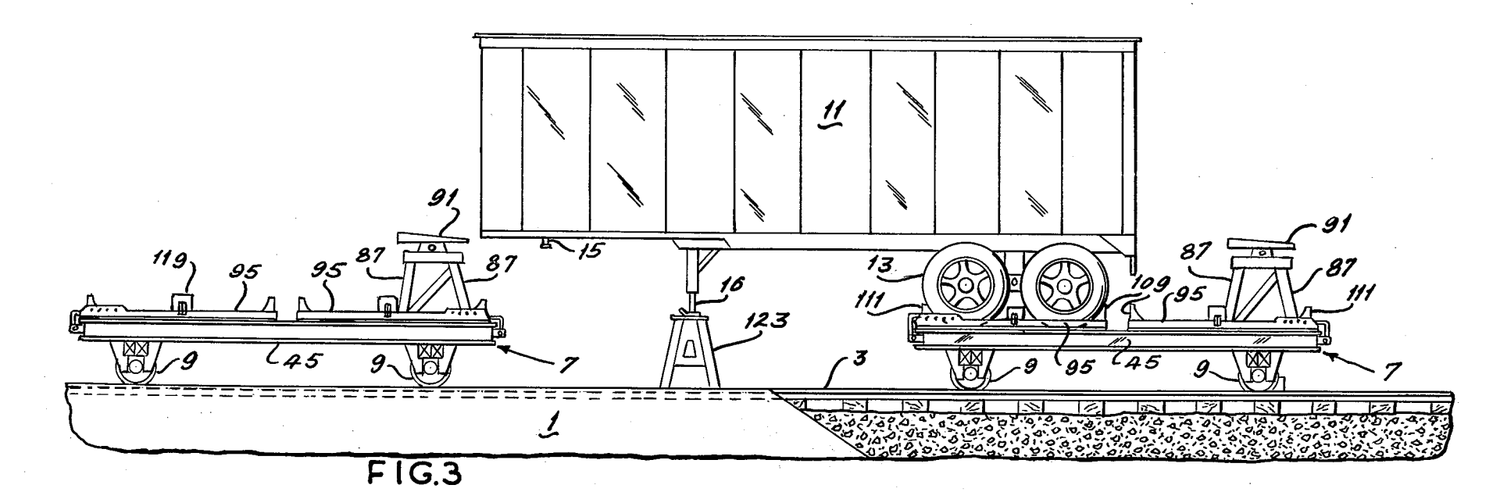
FIG. 3 is a side elevational view showing the second railway truck being moved into position rearwardly toward the semi-trailer for engagement of the fifth wheel pedestal support with the king pin on the semi-trailer.
Figure 4:
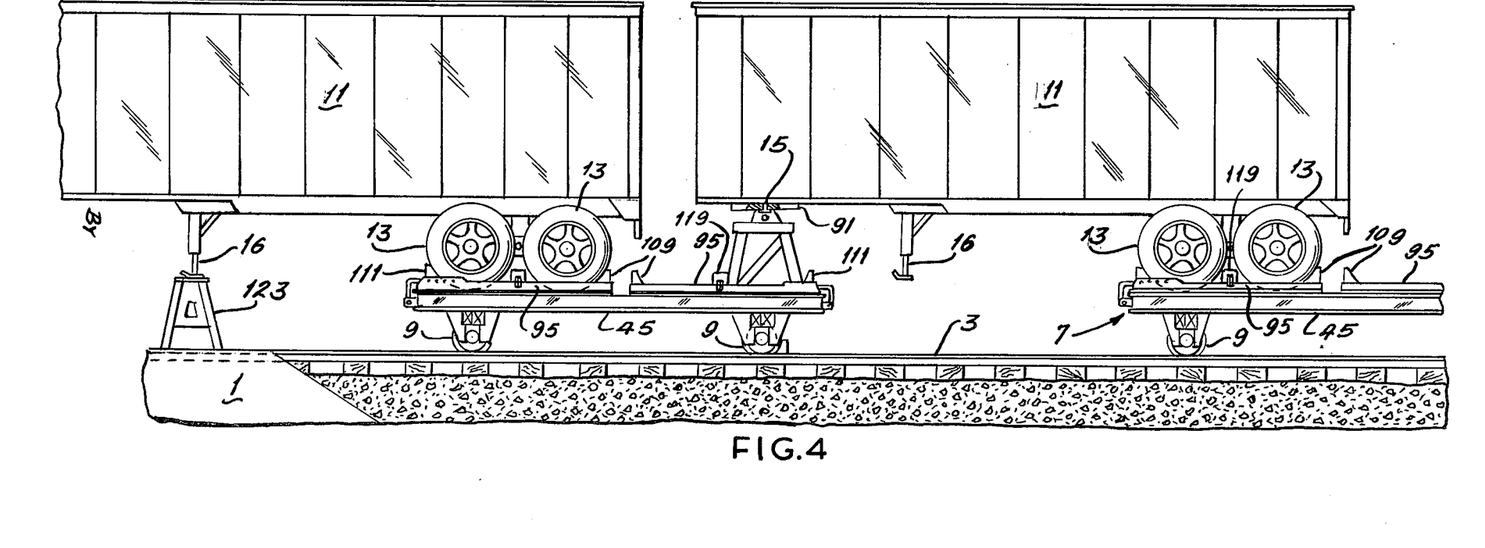
FIG. 4 shows a semi-trailer fully supported by means of its wheels on the forward highway wheel supporting structure of one railway truck and its king pin supported at the rear end of the second railway truck by means of the fifth wheel pedestal thereon with a second semi-trailer having its wheels supported on the forward wheel supporting structure of the second truck and its forward end supported by its landing gear and a pedestal therefor for engagement with the fifth wheel pedestal of a third railway truck.

Operation of the system for transporting semi-trailers is as follows: A plurality of empty railway trucks 7 are positioned ahead of the loading area, i.e., to the left of the structure illustrated in FIGS. 1 and 2, after which the first railway truck 7 is positioned as shown in FIG. 1, ramp 31 is moved into position by means of its supporting low-life truck, tractor 17 couples to the first semi-trailer 11 in an adjacent parking area and backs it onto the left hand wheel supporting structure 95–99 on the rail truck, and outer chocks 111 are positioned against the forward wheels 13 on the semi-trailer and locked into place by pins 113.

Ramp 31 is then removed and tractor 21 pushes first semi-trailer body 11 and with it rail truck 7 rearwardly to a previously designated position. Fifth wheel 25 on tractor 21 is then elevated to raise semi-trailer body 11 until it is substantially level, a suitable portable stanchion 123 is placed under each of the landing gear legs 16 which are thereupon extended to remove the weight of semi-trailer body 11 from the fifth wheel support 25 of tractor 21, trailer king pin 15 is then released and the tractor is moved forwardly away from semi-trailer body 11. A second railway truck 7, with its fifth wheel support 91 positioned at its right hand end is then backed under the forward end of semi-trailer 11 until its fifth wheel is coupled to semi-trailer king pin 15, after which landing gear legs 16 of first semi-trailer 11 are retracted and portable stanchions 123 removed. Meanwhile tractor 21 is again driven to the parking area to pick up a second semi-trailer, ramp 31 is moved into loading position against the forward end of the second railway truck 7, the second semi-trailer is loaded with its highway wheels 13 on the wheel supporting structure 95–99 of the second railway truck 7, the fifth wheel 91 of which is coupled to the king pin 15 of the first semi-trailer, ramp 31 is removed, fifth wheel 25 on the tractor 17 is elevated to raise the front end of the second semi-trailer body 11, a third rail truck 7 is positioned under the forward end of second semi-trailer body 11 with its fifth wheel 91 coupled to king pin 15 of the second semi-trailer and the process is repeated until all semi-trailers are loaded on railway trucks except for the forwardmost one, the king pin of which remains coupled to the elevated fifth wheel 25 of tractor 21, the rail-wheels 27 of which are lowered into guiding engagement with track rails 1, brake tests are made and the train consisting of tractor 21, first semi-trailer body 11, a rail truck 7, a second semi-trailer body 11, a second rail truck 7, etc., the train terminating with the first rail truck 7 mentioned hereinabove, on the forward wheel supporting structure 95–99 of which are mounted the wheels of the first-mentioned semi-trailer. Upon reaching its destination the train is broken up by reversing the steps by which it was made up, as described above. The operation is economical of manpower in that only two men are needed for terminal operations, one to operate the tractor and the other on the ground to position the ramp and stanchions, to raise and lower the landing gear legs, and to position the chocks on the wheel supporting structures of the rail trucks. In transit the train can be operated with a crew consisting of an engineer (driver of the tractor) and conductor.

If it becomes necessary or desirable to move a group of rail trucks from one terminal to another or to shift a group of them around a terminal, each of the trucks is provided with a simple draw bar 125 which is pivotally received in a clevis-like socket 127 on each end sill of each rail truck, the draw bars being swingable out of draft position to a position extending transversely of the car against the end sills, wherein their outer ends are received in a clevis-like bracket 129 and held therein by a suitable pin 131 when not in draft position.

In order that the semi-trailers may be operated in their normal direction during rail transit, i.e., with their front or king pin ends forwardly, and to eliminate the need for turning the rail trucks at terminals to permit such operation, after a train reaches a terminal and the semi-trailers are unloaded, the fifth wheel pedestals 75–89 on each rail truck 7 can be moved to the other end of the rail truck by releasing the pin 85 by which the pedestal structure is held in position longitudinally of the truck and sliding the entire pedestal lengthwise of the guide grooves 69 to the other end of the truck and positioning it thereon by fitting pin 85 through either of the holes 83 in the base plate 75 and extending it downwardly into hole 81 in plate 63 and rotating the fifth wheel so that its king pin receiving opening is in the opposite direction, i.e., toward the adjacent end of the rail truck. As pointed out above, when the pedestal base plate is so positioned, it opposes any swivelling movement of the correspondingly positioned highway wheel supporting structure while freeing the other highway wheel supporting structure to swivel slightly to accommodate to track curvature when the train is made up and is in transit between terminals.

The details of the construction may be varied without departing from the spirit of the invention and the exclusive use of those modifications as come within the scope of the appended claims is contemplated.

I claim:

1. In a system for transporting freight carriers including highway semi-trailers by rail, a rail truck having at least two longitudinally spaced wheeled axles and a frame supported thereon, a central guideway extending longitudinally substantially from end to end of said truck frame, pedestal structure mounted in said guideway for movement lengthwise thereof substantially from end to end of said truck frame and supporting a fifth wheel, a pair of highway wheel supporting structures supported in end to end relation with each other lengthwise of said truck frame and each comprising a pair of transversely spaced longitudinally extending treadways spaced apart transversely a sufficient distance to receive said pedestal structure between them and a transverse member connecting the treadways of each wheel supporting structure to each other and extending beneath said longitudinal guideway, whereby to permit movement of said fifth wheel pedestal structure to selective positions alternately abreast of said highway wheel supporting structures and thereby accommodating the selective support of the rear highway wheels of a semi-trailer on either of said highway wheel supporting structures and the support of the front king pin of a second highway semi-trailer by said fifth wheel on the end portion of the truck frame carrying said other highway wheel supporting structure.

2. In a system for transporting freight carrier including highway semi-trailers by rail according to claim 1, said truck frame having horizontal deck elements adjacent its sides underlyingly slidably supporting end portions of the respective treadways, means pivotally securing said transverse member to said truck frame to accommodate limited swivelling movements of said wheel supporting structures on said truck frame, said fifth wheel supporting structure having a base narrower than the transverse spacing between said treadways and an element depending therefrom and slidably positionable in said guide structure, means for securing said base on said underframe in selected positions lengthwise thereof between the treadways alternatively of either of said highway wheel supporting structures, whereby either one of said highway wheel supporting structures can be utilized to support the bogie wheels of a highway semi-trailer and said fifth wheel support structure can be positioned abreast of said other wheel supporting structure to support the king pin of an adjacent semi-trailer in end-to-end relation with the first-named semi-trailer, thereby permitting utilization of said railway truck in both directions and eliminating the need of turning said truck for movement in the opposite direction.

3. In a system for transporting freight carriers including highway semi-trailers by rail according to claim 2, said longitudinally extending guideway having a pair of longitudinal vertical webs spaced apart transversely of said truck, means defining transversely inwardly open grooves on both said webs, said depending element from the base of said fifth wheel support structure having transversely projecting portions slidably received in both said grooves, whereby to accommodate selective positioning of said fifth wheel support structure horizontally of said truck while preventing tipping of said fifth wheel support structure with respect to said truck frame.

4. In a system for transporting freight carriers including highway semi-trailers by rail according to claim 3, said groove-forming means comprising a plate defining the lower edge of both said grooves, said plate being centrally apertured, a pin receivable in said aperture and forming means for pivotally securing said wheel supporting structure transverse member to said guideway structure and for securing said fifth wheel support structure base to said underframe in selected positions lengthwise thereof, said wheel supporting structure transverse members and said fifth wheel support structure base depending element being formed with apertures therethrough to receive said pins when said last-named apertures are in vertical registry with said first-named apertures.

5. In a system for transporting freight carriers including highway semi-trailers by rail according to claim 2, said horizontal deck elements being spaced apart longitudinally of the truck frame to underlyingly support the ends of said treadways while leaving the truck frame therebetween substantially unobstructed to receive the end portions of said wheel supporting structure transverse members, said end portions extending upwardly from said transverse member between said deck elements and being secured at their upper extremities to the bottom of said treadway.

6. In a system for transporting freight carriers including highway semi-trailers by rail according to claim 5, said truck frame including pairs of transverse cross members spaced apart longitudinally of the truck from each other and located substantially midway between the center of the truck and the ends thereof, said transverse truck frame members underlying said guideway, said wheel supporting structure transverse members being positioned between said truck frame transverse members of each pair in underlying relation with respect to said guideway and having upstanding elements connecting each end of said wheel supporting structure transverse member to the respective treadways thereof.

7. In a system for transporting freight carriers including highway semi-trailers by rail according to claim 6, said pivotal securement means of said transverse member to said truck frame comprising cooperating pivot-forming elements on said transverse member and said guideway intermediate the respective pairs of truck frame transverse members, said truck frame transverse members of each pair being spaced apart sufficiently lengthwise of the truck to accommodate limited swivelling of the respective wheel supporting structure on the truck frame.

8. In a system for transporting freight carriers including highway semi-trailers by rail according to claim 2, said fifth wheel support structure base being mounted in said longitudinal guide structure and having straight sides in proximate relation with the inner sides of said wheel supporting structure treadways such that, when said fifth wheel supporting structure base is positioned abreast of one of said wheel supporting structures, said one wheel supporting structure will be held against substantially swivelling movement with respect to said truck frame.

9. In a system for transporting freight carriers including highway semi-trailers by rail according to claim 1, each of said treadways having a fixed chock member at its end remote from the adjacent end of the railway truck, and a removable chock member at its other end.

10. In a system for transporting freight carriers including highway semi-trailers by rail according to claim 1, each of said treadways comprising an upwardly open channel having its web horizontal and adapted to support the semi-trailer wheels and its flanges extending upwardly from its web for guiding and positioning the semi-trailer wheels.

11. In a system for transporting freight carriers including highway semi-trailers by rail according to claim 10, a fixed chock member positioned in the end of each said treadway channel remote from the adjacent end of the railway truck and a removable chock member positioned in the other end of each said treadway channel.

12. In a system for transporting freight carriers including highway semi-trailers by rail according to claim 11, means for removably securing said removable chock member in each said treadway channel comprising apertures in the upstanding flanges of said channel adjacent the longitudinally outboard end thereof, a transverse aperture means through said removable chock member alignable with said flange apertures and an elongate securing member insertable through the aligned apertures in said flanges and said chock member and securable therein to hold said removable chock member in functional position in said treadway channel.

13. In a system for transporting freight carriers including highway semi-trailers by rail according to claim 12, a plurality of longitudinally spaced apart apertures in said treadway channel flanges positioned for selective alignment with the aperture means in said removable chock member whereby to permit selective positioning of said removable chock member lengthwise of said treadway in accordance with the wheel spacing of a highway semi-trailer supported on said treadway.

14. In a system for transporting freight carriers including highway semi-trailers by rail according to claim 1, pedestal support elements mounted in each of said treadways for supporting and securing a corner of a demountable freight receptacle to the respective treadway.

15. In a system for transporting freight carriers including highway semi-trailers by rail according to claim 14, each of said pedestal support elements being pivoted to the outside of the respective treadway and swingable about a longitudinal axis from an operating position within said treadway to an another position outboard thereof, whereby to leave said treadway clear for the reception of highway wheels of a semi-trailer during loading and unloading of the semi-trailer.

16. In a system for transporting freight carriers including highway semi-trailers by rail according to claim 15, each of said pedestal support elements having a bottom surface restable upon the floor of the respective treadway and a top surface underlyingly supportingly engageable with the bottom of a freight receptacle, and manually actuable means for simultaneously locking said pedestal support element to the floor of said treadway and to the bottom of the supported freight receptacle for securing the latter on the treadway.

17. In a system for transporting freight carriers including highway semi-trailers by rail according to claim 16, said manually actuable locking means comprising a rotatable locking lug having a vertical cylindrical portion protruding from the top and bottom surfaces of said pedestal support element and eccentric elements on the portions of said locking means protruding above and below the top and bottom surfaces of said pedestal support element, the respective bottom and top surfaces of said top and bottom eccentric portions being spaced apart from each other a greater distance than the top and bottom surfaces of said pedestal support element, whereby to permit said eccentric portions to lockably engage the bottom surface of the respective treadway and a securing flange on the bottom of a freight receptacle when said securing element is rotated substantially through a right angle from a released position.

18. In a system for transporting freight carriers including highway semi-trailers by rail according to claim 17, said cylindrical portion of said securing means being diametrally apertured and a key slidable in said aperture for rotating said securing member between released and locking positions, said pedestal support element being formed with apertures selectively registrable with said key when said securing means is in the released and locked positions, whereby to maintain said securing means in such selected positions.

19. A system for transporting freight carriers including highway semi-trailers by rail comprising highway semi-trailers, each having a body with a downwardly facing fifth wheel at its forward end and a pair of highway wheels at its rear end, railway trucks having at least two acles, a truck frame supported thereon and a pair of highway wheel support structures comprising transversely spaced, longitudinally extending treadways swively mounted on opposite ends of said trucks, the highway wheels of said semi-trailers resting on corresponding highway wheel support structures of said trucks, a fifth wheel support structure mounted on each of said truck frames for selective positioning lengthwise thereof between the treadways of either of said highway wheel supporting structures and positioned on each truck frame abreast of the highway wheel supporting structure other than that in wheel supporting relation with the highway wheels of the respective semi-trailers, the fifth wheel of each of said semi-trailers being supported on the fifth wheel support of the rail truck supporting the highway wheels of the forwardly adjacent semi-trailer.

20. A system for transporting freight carriers including highway semi-trailers by rail according to claim 19, including a rail-and-road tractor having a fifth wheel support in underlying supporting relation with the fifth wheel on the forwardmost semi-trailer.

21. A system for transporting freight carriers including highway semi-trailers by rail according to claim 20, wherein said last-named fifth wheel support on said tractor is vertically movable between a relatively low road-hauling position in which a coupled trailer has its highway wheels resting on a road surface and a rail-hauling position in which said last-named fifth wheel support is relatively higher conforming to the height of a semi-trailer fifth wheel when the highway wheels of said semi-trailer are resting on the highway wheel supporting structure of said rail trucks.

22. A system for transporting freight carriers including highway semi-trailers by rail according to claim 21, including a loading facility having a railway track supporting a plurality of railway trucks, a road vehicle supporting surface in part substantially co-planar with the top surface of said railway track and adapted to support said tractors and semi-trailers via their respective highway wheels.

23. A system for transporting freight carriers including highway semi-trailers by rail according to claim 22 including movable ramps supported on said road vehicle supporting surface and having their lower ends substantially at the level of said road vehicle supporting surface and their upper ends substantially at the level of the rail truck mounted treadways, said ramp being movable into engagement with a rail truck for raising the highway wheels of a semi-trailer from the road vehicle supporting surface to the treadways on said rail truck and movable therefrom to permit the movement of a second rail truck under the forward end of the semi-trailer and the engagement of the fifth wheel on the rear end of said second rail truck with the king pin depending from the semi-trailer.

24. A system for transporting freight carriers including highway semi-trailers by rail according to claim 23 wherein the semi-trailers are formed with depending extensible landing gear legs intermediate their rear highway wheels and their forward king pins, including a portable stanchion positionable under said semi-trailer landing gear legs when said semi-trailer highway wheels are supported on the treadways of one railway truck and before the king pin of the semi-trailer is engaged with the fifth wheel on another railway truck, whereby the front end of the semi-trailer and king pin can be mounted at the proper height for engagement of the king pin with the fifth wheel on the second railway truck, said landing gear support stanchion being removable from its landing gear supporting location to permit repositioning and movement of the rail truck supported semi-trailer along the railway track.

25. A pedestal support element for supporting and securing a corner of a receptacle to a vehicle bed, having a bottom surface restable upon the vehicle deck, a top surface underlying supportingly engageable with the receptacle bottom, and manually actuable means for simultaneously locking the pedestal support element to the vehicle bed and to the bottom of the supported receptacle for securing the latter on the deck, said manually actuable locking means comprising a rotatable locking lug having a vertical cylindrical portion protruding from said top and bottom surfaces with eccentric elements on the protruding portions, the respective bottom and top surfaces of said top and bottom eccentric elements being spaced apart from each other a greater distance than the top and bottom surfaces of the pedestal support element whereby to permit said eccentric portions to lockably engage the bottom surface of the vehicle deck and a securing flange on the bottom of a receptacle when said locking lug element is rotated substantially through a right angle from a released position, said cylindrical portion of said locking lug being diametrically apertured and including a key slidable in said aperture for rotating said locking lug between released and locking positions, and apertures formed on the support element for selective registration with said key when said locking lug is in the released and locked positions, whereby to maintain said locking lug in such selected positions.

26. A pedestal support element according to claim 25 having pivot means for connecting it to the deck of a vehicle for swinging it from an operative container support position to an another position laterally outwardly thereof whereby to permit semi-trailers to be move onto and off the vehicle deck.

* * * * *